(12) United States Patent
Oki et al.

(10) Patent No.: US 10,739,506 B2
(45) Date of Patent: Aug. 11, 2020

(54) OPTICAL MEMBER, LIGHT GUIDING MEMBER, AND METHOD FOR PRODUCING OPTICAL MEMBER

(71) Applicants: KYUSHU UNIVERSITY, NATIONAL UNIVERSITY CORPORATION, Fukuoka (JP); USHIO DENKI KABUSHIKI KAISHA, Tokyo (JP)

(72) Inventors: Yuji Oki, Fukuoka (JP); Kinichi Morita, Tokyo (JP)

(73) Assignees: KYUSHU UNIVERSITY, NATIONAL UNIVERSITY CORPORATION, Fukuoka (JP); USHIO DENKI KABUSHIKI KAISHA, Toyko (JP)

( * ) Notice: Subject to any disclaimer, the term of this patent is extended or adjusted under 35 U.S.C. 154(b) by 0 days.

(21) Appl. No.: 15/576,737

(22) PCT Filed: Apr. 22, 2016

(86) PCT No.: PCT/JP2016/062774
§ 371 (c)(1),
(2) Date: Nov. 24, 2017

(87) PCT Pub. No.: WO2016/190016
PCT Pub. Date: Dec. 1, 2016

(65) Prior Publication Data
US 2019/0011624 A1 Jan. 10, 2019

(30) Foreign Application Priority Data
May 27, 2015 (JP) ................... 2015-107930
Jul. 3, 2015 (JP) ................... 2015-134803

(51) Int. Cl.
*G02B 5/22* (2006.01)
*F21V 8/00* (2006.01)
(Continued)

(52) U.S. Cl.
CPC ............ *G02B 6/0016* (2013.01); *G02B 1/04* (2013.01); *G02B 6/243* (2013.01); *G02B 1/045* (2013.01); *G02B 5/003* (2013.01); *G02B 6/0096* (2013.01)

(58) Field of Classification Search
CPC .................................. G02B 1/10; G02B 5/003
See application file for complete search history.

(56) References Cited

U.S. PATENT DOCUMENTS 9,683,936 B2    6/2017   Oki et al.
2010/0214506 A1*   8/2010   Gaides ................. G02B 5/0263
                                                                                             349/61

(Continued)

FOREIGN PATENT DOCUMENTS

EP    2 367 031 A1    9/2011
EP    2 881 726 B1    3/2017
(Continued)

OTHER PUBLICATIONS

International Search Report issued in PCT/JP2016/062774; dated Aug. 2, 2016.

*Primary Examiner* — Andrew J Coughlin
(74) *Attorney, Agent, or Firm* — Studebaker & Brackett PC

(57) ABSTRACT

The purpose of the present invention is to provide an optical member and the like which enable suppression of diffusion of stray light due to a pigment even when the optical member and the like are used adjacent to a light guiding part through which incident light is transmitted. The optical member is configured to be used adjacent to the light guiding (Continued)

part through which the incident light is transmitted and to attenuate the incident light. The optical member has a dispersed carbon particle part that is formed as a result of dispersion of carbon particles in a particular region in a silicone resin. The carbon particles are stray light diffusion suppressing particles for suppressing the intensity of light being incident onto the carbon particles and diffused.

16 Claims, 8 Drawing Sheets

(51) Int. Cl.
*G02B 1/04* (2006.01)
*G02B 6/24* (2006.01)
*G02B 5/00* (2006.01)

(56) References Cited

U.S. PATENT DOCUMENTS

| | | |
|---|---|---|
| 2011/0200810 A1 | 8/2011 | Kubota |
| 2014/0092284 A1 | 4/2014 | Akiyama et al. |
| 2015/0125689 A1 | 5/2015 | Kubota |
| 2015/0325613 A1* | 11/2015 | Rudmann ............ H04N 5/2252 250/208.1 |

FOREIGN PATENT DOCUMENTS

| | | |
|---|---|---|
| JP | 2006-337837 A | 12/2006 |
| JP | 2008-102278 A | 5/2008 |
| JP | 2011-186437 A | 9/2011 |
| JP | 2013-020118 A | 1/2013 |
| JP | 2013-205509 A | 10/2013 |
| JP | 2014-021231 A | 2/2014 |
| JP | 2014-032064 A | 2/2014 |
| JP | 2014-071229 A | 4/2014 |

\* cited by examiner

FIG. 5
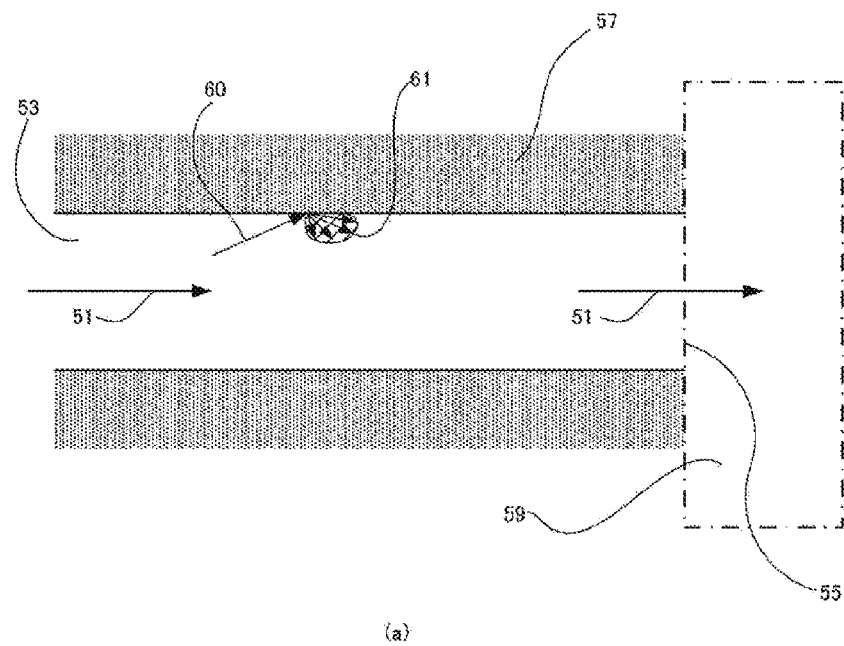
(a)
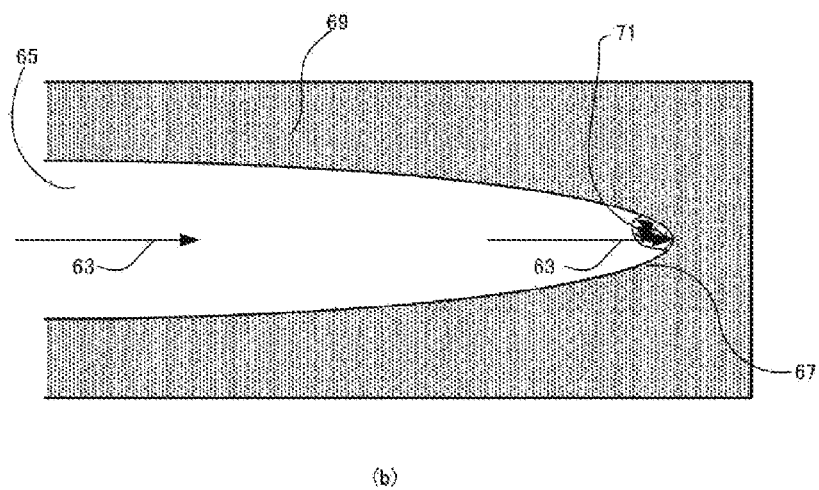
(b)

FIG. 7
(a)
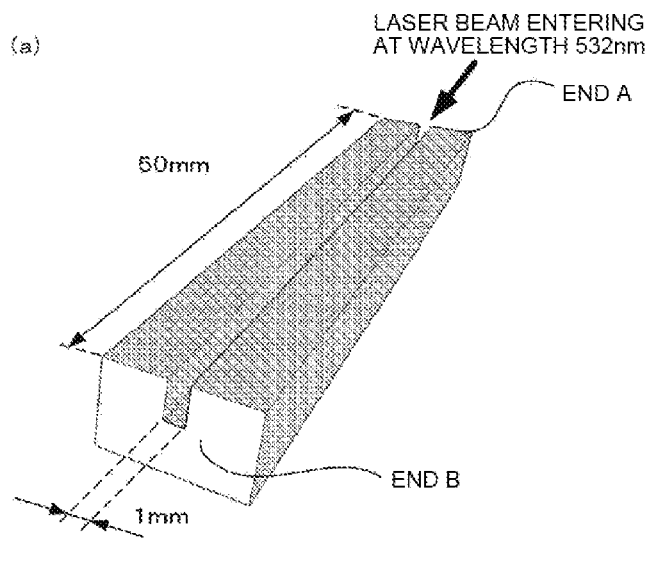
(b) 45-DEGREE BENDING
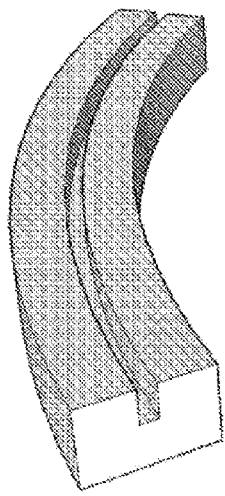
(c) 90-DEGREE BENDING
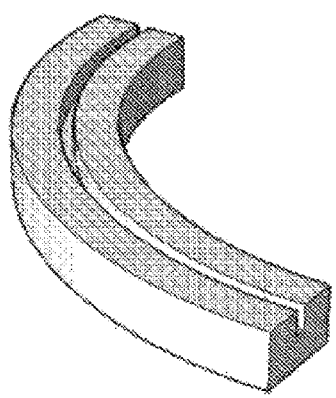

OPTICAL MEMBER, LIGHT GUIDING MEMBER, AND METHOD FOR PRODUCING OPTICAL MEMBER

TECHNICAL FIELD

The present invention relates to optical members, light guide members, and methods of manufacturing optical members. The present invention, in particular, relates to an optical member and so on used adjacent to a light guide unit, which is designed to transmit incident light, to attenuate the incident light.

BACKGROUND ART

Typically, the sensitivity of emission spectrometry that uses emission phenomena of substances, molecules, or atoms is very high. Analyses in which samples are irradiated with light and light radiated from the samples is used are also in use. Absorptiometry and Laser Induced Fluorescence (LIF) are examples of such optical analyses.

In recent years, there is a demand that the size of the above-mentioned optical measurement devices and optical measurement apparatuses be reduced to a portable size. Also, there is a demand for an increased measurement performance.

The reduction in the size of an optical measurement apparatus leads to a reduced distance between a light source that irradiates a sample with light and a detector that monitors observation light from the sample within the apparatus. Optical elements, such as a condenser lens and an optical filter, are present in a light guide path constituting an irradiation optical system for guiding irradiation light from the light source to the sample or in a light guide path constituting an observation light collecting optical system for guiding observation light from the sample to the detector. Thus, an influence of stray light that can act as noise in the measurement, such as reflected light and scattered light, generated while light travels in a light guide path within the apparatus becomes more prominent as the size of the apparatus is reduced. Such stray light is also generated on an inner wall of the apparatus housing.

The inventors have proposed a light-induced fluorescent measurement device (Patent Literature Document 1) in which an optical system and a monolithic housing are built with resin that at least partially contains a pigment, in order to reduce the influence of stray light as much as possible and also to reduce the size of an optical measurement apparatus. This relates to an LIF apparatus.

Specifically, the light-induced fluorescent measurement device has the following characteristic configuration. (1) A light guide path of an irradiation optical system and a light guide path of an observation light collecting optical system are partially filled with resin transparent to irradiation light and observation light. (2) Another resin is provided to enclose the transparent resin of these light guide paths. This resin contains a pigment. (3) The pigment has a property of absorbing stray light. An amount of the pigment to be contained in the resin is set to an amount at which at least the stray light is entirely absorbed. (4) Resin materials in the transparent resin and in the pigment-containing resin are of the same type.

The above-described configuration provides the following advantageous effects, for example. As the resin materials in the transparent resin and in the pigment-containing resin are of the same type, reflection or scattering of light at an interface where the two resins are in contact with each other is suppressed. The stray light incident onto the pigment-containing resin is absorbed by the pigment. Therefore, almost no stray light returns to the transparent resin of the light guide paths. Furthermore, no stray light leaks to the outside of the pigment-containing resin. Therefore, almost no complex multiple reflection of stray light occurs. Consequently, no measure against the complex multiple reflection needs to be taken in the observation light collecting optical system.

LISTING OF REFERENCES

Patent Literature Documents

Patent Literature Document 1: Japanese Patent Application Laid-Open Publication (Kokai) No. 2014-032064

SUMMARY OF THE INVENTION

Problems to be Solved by the Invention

However, the pigment is particulate. Thus, although the pigment has a property of absorbing the stray light, some of the stray light incident onto the pigment is scattered. Depending on the relationship between the wavelength of the stray light and the size of the pigment particles, the scattering of some of the stray light can result in Mie scattering, Rayleigh scattering, or geometric scattering.

The teaching described in Patent Literature Document 1 focuses on the absorption property of the pigment. However, an influence of scattering of stray light caused by the pigment particles is not given sufficient consideration.

Accordingly, an object of the present invention is to provide an optical member and so on that can suppress scattering of stray light caused by a pigment even when used adjacent to a light guide unit adapted to transmit incident light.

Solution to the Problems

According to a first aspect of the present invention, there is provided an optical member used adjacent to a light guide unit adapted to transmit incident light, the optical member being configured to attenuate the incident light. The optical member includes a carbon particle-dispersed unit in which carbon particles are dispersed in a specific region of a silicone resin. The carbon particles are particles for suppressing stray light scattering, and reduce an intensity of light incident onto the carbon particles and scattered by the carbon particles.

A second aspect of the present invention provides a modification to the optical member of the first aspect. Specifically, the carbon particles in the carbon particle-dispersed unit include carbon black particles, and the carbon black particles in the carbon particle-dispersed unit consist of carbon black particles having a minor axis of no greater than 2 μm.

A third aspect of the present invention provides a modification to the optical member of the first or second aspect. Specifically, the carbon particles in the carbon particle-dispersed unit include a carbon nanotube (or carbon nanotubes).

A fourth aspect of the present invention provides a modification to the optical member of the second or third aspect. Specifically, the specific region of the silicone resin is a region corresponding to a region extending to a depth of an absorption length of specific light from a boundary between the light guide unit and the optical member when the optical member is used adjacent to the light guide unit.

A fifth aspect of the present invention provides a modification to the optical member of the fourth aspect. Specifically, the specific light is noise light that is different from the incident light.

According to a sixth aspect of the present invention, there is provided a light guide member configured to guide incident light. The light guide member includes a light guide unit that transmits the incident light and includes at least partially a silicone resin transparent to the incident light. The light guide member also includes a stray light absorbing unit that is adjacent to the light guide unit and includes a carbon particle-dispersed silicone resin in which carbon particles are dispersed in a silicone resin having a refractive index, which is equal to a refractive index of the transparent silicone resin. The carbon particles are particles for suppressing the scattering of stray light, which reduce an intensity of light incident onto the carbon particles and scattered by the carbon particles.

A seventh aspect of the present invention provides a modification to the light guide member of the sixth aspect. Specifically, the carbon particles in the carbon particle-dispersed unit include carbon black particles, and the carbon black particles in the carbon particle-dispersed unit consist of carbon black particles having a minor axis of no greater than 2 μm.

An eighth aspect of the present invention provides a modification to the light guide member of the sixth or seventh aspect. Specifically, the carbon particles in the carbon particle-dispersed unit include a carbon nanotube (or carbon nanotubes).

According to a ninth aspect of the present invention, there is provided a method of manufacturing an optical member that is used adjacent to a light guide unit adapted to transmit incident light. The optical member is configured to attenuate the incident light. The method includes a step of dispersing a carbon black in an uncured undispersed silicone resin that has not been cured, to form an uncured dispersed silicone resin. The method also includes a step of curing the uncured dispersed silicone resin to form a cured dispersed silicone resin. The step of dispersing a carbon black disperses the carbon black in the uncured undispersed silicone resin such that the dispersed carbon black has a concentration of between 5 wt %, inclusive, and 20 wt %, inclusive.

Advantageous Effects of the Invention

The respective aspects of the present invention can provide an optical member and so on that can suppress scattering and achieve light attenuation even when used adjacent to a light guide unit adapted to transmit incident light.

According to the second aspect of the present invention, the resin that has the dispersed carbon black therein is used adjacent to the light guide unit that transmits the incident light. Thus, it is possible to achieve both of restricting the scattering of the stray light and weakening the intensity of the stray light.

In the following description, the particle diameter of the pigment such as carbon black is a minor axis (breath) of the particle. The particle diameter of the pigment becomes larger with the content (weight %) of the pigment to be contained in the transparent resin as the coagulation of the pigment proceeds. When the wavelength of the light is λ, the intensity of scattering by Rayleigh scattering is proportional to $1/\lambda^4$. Thus, the intensity of scattering becomes smaller as the wavelength of the incident light becomes longer. In case of the Mie scattering, on the other hand, the intensity of the scattered light is proportional to $1/\lambda^2$, and the intensity of the scattered light less depends on the wavelength, as compared to the Rayleigh scattering. Thus, the light is scattered in a relatively similar manner, regardless of the wavelength. Accordingly, it is preferred that the diameter of the particle is decided to avoid or reduce the influence of the Mie scattering as much as possible.

The study conducted by the inventors revealed that the coagulation of the particles proceeds depending upon the content (weight %) of the particles to be contained in the transparent resin, and the particle diameter (particle size) substantially become larger as the coagulation proceeds. Based on this finding by the inventors, the present invention appropriately decides an amount of the black carbon pigment to be contained in the silicone resin, and can suppress the influence of the scattering when the stray light is incident onto the pigment.

According to the third aspect of the present invention, the resin that has the carbon nanotube is dispersed therein is used adjacent to the light guide unit that transmits the incident light, and it is possible to not only suppress the scattering of the stray light but weaken the intensity of the stray light. It is not known to what extent the suppression of the scattering would be achieved by carbon materials except for the carbon black. It can be assumed that the characteristics may significantly change with the material. The advantageous effect of the third aspect of the present invention relies upon the optical characteristics of the carbon nanotube, which were found by the study and development of the inventors.

According to the fourth aspect of the present invention, it is possible to easily suppress, in particular, the scattering of the light that enters the optical member from the light guide unit.

According to the fifth aspect of the present invention, it is possible to further easily provide the optical member in a practical manner. In general, the wavelength used in the optical measurement falls in a range approximately between the wavelength of the ultraviolet light and the wavelength of the visible light (200 nm to 780 nm). Scattering of noise light should, in particular, be suppressed in the optical measurement, and it is possible to easily adjust the optical member based on the wavelength of the noise light.

BRIEF DESCRIPTION OF THE DRAWINGS

FIG. 2(a) shows the results when the concentration of the carbon black is 1 wt %, FIG. 2(b) shows the results when the concentration of the carbon black is 5 wt %, FIG. 2(c) shows the results when the concentration of the carbon black is 10 wt %, and FIG. 2(d) shows the results when the concentration of the carbon black is 20 wt %.

FIG. 4(a) shows the angular characteristics distributions when the concentration of the carbon black is 1 wt %, FIG. 4(b) shows the angular characteristics distributions when the concentration of the carbon black is 5 wt %, FIG. 4(c) shows the angular characteristics distributions when the concentration of the carbon black is 10 wt %, and FIG. 4(d) shows the angular characteristics distributions when the concentration of the carbon black is 20 wt %.

FIG. 5 is a set of views to show that the desirable scattering condition differs depending on a state of a light exit of the light guide unit.

FIG. 7 is a set of views to schematically illustrate optical systems, which are used to compare the stray light absorption characteristics of the optical members. FIG. 7(a) shows an optical system that is linear, FIG. 7(b) shows an optical system that bends 45 degrees, and FIG. 7(c) shows an optical system that bends 90 degrees.

DESCRIPTION OF EMBODIMENTS OF THE INVENTION

Hereinafter, embodiments of the present invention will be described with reference to the drawings. It should be noted that embodiments of the present invention are not limited to the following embodiments.

First Embodiment

Figure 1:
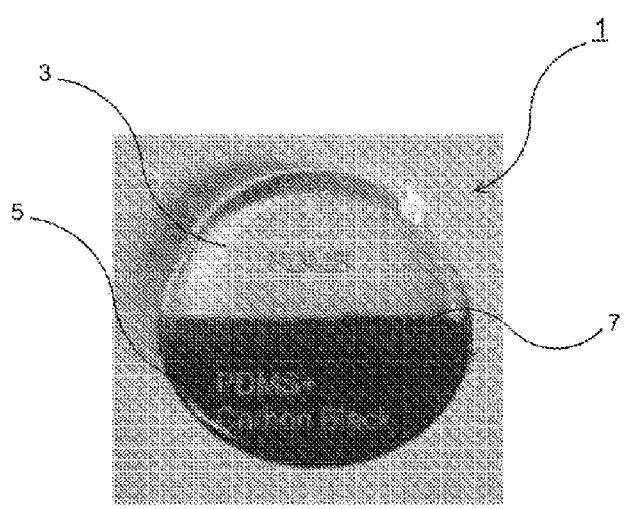
FIG. 1 illustrates a sample prepared to evaluate the light-blocking property (scattering property) of a pigment-containing silicone resin.

To evaluate the light-blocking property of a pigment-containing silicone resin (to evaluate the scattering property), a disk-shaped sample 1 illustrated in FIG. 1 was fabricated. The disk-shaped sample 1 is a disk-shaped transparent silicone resin and includes a transparent semicircular portion 3 composed of a transparent silicone resin and a pigment semicircular portion 5 composed of a silicone resin containing a pigment. A PDMS resin (silicone impression material SIM-360 from Shin-Etsu Silicone (registered trademark)) was used as the transparent silicone resin.

A pigment was dispersed in the aforementioned PDMS, and the pigment-containing silicone resin was thus formed. Specifically, a carbon black (KE-COLOR-BL from Shin-Etsu Silicone (registered trademark)) was introduced into a base resin of the SIM-360, which was then mixed in a planetary automatic mixer (KK-505 from KURABO (registered trademark)). The mixing operation was carried out twice under the following mixing conditions: the number of revolutions was 1440 rpm; the number of rotations was 1008 rpm; and the mixing time was 200 sec.

Four types of disk-shaped samples 1 were fabricated with the concentration of the carbon black dispersed in the PDMS varied. Specifically, the concentration of the carbon black dispersed in the PDMS was varied among 1 wt %, 5 wt %, 10 wt %, and 20 wt %. The curing time of the PDMS was one hour.

When the concentration of the carbon black exceeded 20 wt %, the carbon black introduced in the base resin of the SIM-360 coagulated prominently within the base resin of the SIM-360, and the base resin and the carbon black were separated at a plurality of sites. The separation of the base resin and the carbon black remained even when the base resin and the carbon black were mixed in the planetary automatic mixer after the separation took place, and the carbon black was unable to be dispersed in the base resin. This reveals that setting the concentration of the carbon black to no greater than 20 wt % can prevent the base resin and the carbon black from being separated.

Figure 2:
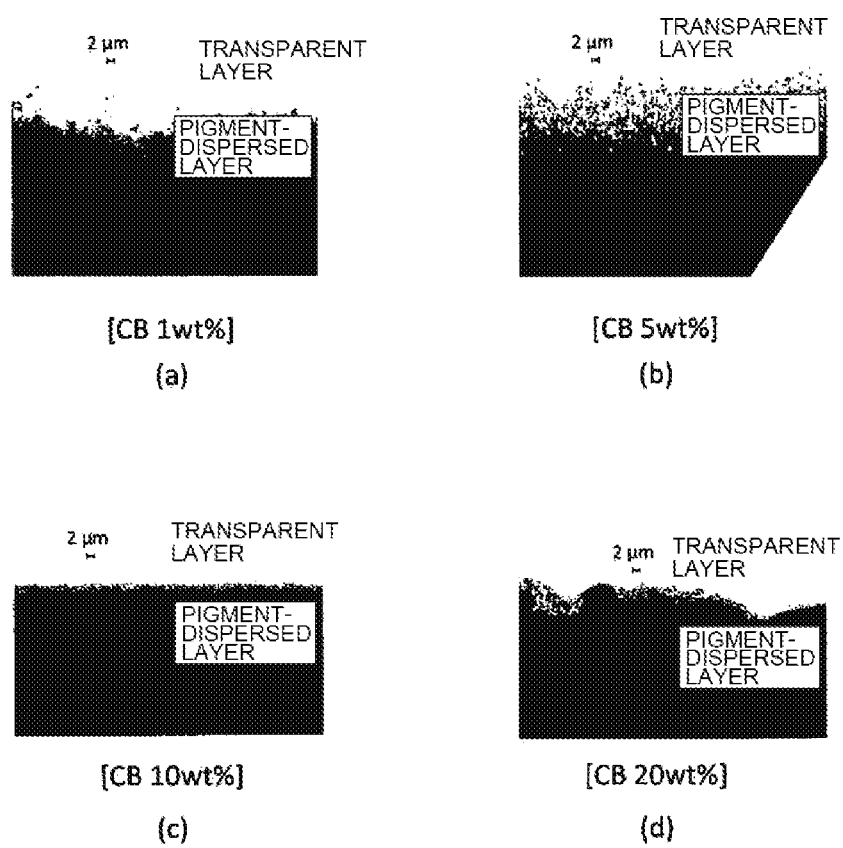
FIG. 2 is a set of views to illustrate results of observing an interface between the transparent semicircular portion and the pigment semicircular portion when four disk-shaped samples are used.

FIG. 2 illustrates results of observing an interface between the transparent semicircular portion and the pigment semicircular portion in four disk-shaped samples. FIG. 2(a) shows the result of the observation when the concentration of the carbon black is 1 wt %, FIG. 2(b) shows the result of the observation when the concentration of the carbon black is 5 wt %, FIG. 2(c) shows the result of the observation when the concentration of the carbon black is 10 wt %, and FIG. 2(d) shows the result of the observation when the concentration of the carbon black is 20 wt %. The observation magnification is 400×. These observation diagrams show the result of monitoring the intensity of light having a wavelength of 532 nm transmitted through the interface between the transparent semicircular portion and the pigment semicircular portion and the vicinity of the interface.

The result of the observation indicates that the particle size of the carbon black is approximately 0.5 μm to 2.0 μm. It was found that when the concentration of the carbon black was 1 wt %, 5 wt %, or 10 wt %, the particle sizes of the carbon black fell substantially within the aforementioned range and a variation in the particle size was relatively small.

On the other hand, when the concentration of the carbon black was 20 wt %, the particle sizes of most of the carbon black were substantially within the range of from 0.5 μm to 2.0 μm, as in the cases in which the concentration of the carbon black was 1 wt %, 5 wt %, or 10 wt %. However, the carbon black coagulated partially. Another experiment confirmed that the carbon black coagulated at locations where the concentration of the carbon black exceeded 10 wt %.

In other words, the carbon black did not coagulate when the concentration of the carbon black was 1 wt %, 5 wt %, or 10 wt %, and it was possible to maintain the characteristics as a silicone resin (rubber) in which the carbon black was dispersed.

When the concentration of the carbon black exceeded 10 wt %, the carbon black started coagulating. However, the particle size (diameter) of the carbon black was kept no greater than 2 μm until the concentration reached 20 wt %.

When the concentration of the carbon black exceeded 10 wt %, some of the particle sizes of the carbon black exceeded 2 μm due to the coagulation of the carbon black. Furthermore, as described above, when the concentration exceeded 20 wt %, the base resin of the PDMS and the carbon black were separated in some locations depending on the concentration.

If a PDMS of which the curing time of a PDMS resin, which is a silicone resin, can be reduced from the current curing time (one hour, herein) is developed, it may become possible to keep the particle size (diameter) of the carbon black no greater than 2 μm and to prevent the base resin and the carbon black from being separated even when the concentration of the carbon black exceeds 20 wt %.

However, with the performance of the currently exiting PDMS resin, the practical concentration of the carbon black is no greater than 20 wt %.

The interface between the transparent semicircular portion 3 and the pigment semicircular portion 5 is defined clearly to a certain extent when the concentration of the carbon black is 10 wt % or 20 wt %. In other words, it was confirmed that the particles of the carbon black were concentrated along the interface.

Next, the angular characteristics of the scattered light intensity in the samples in which the concentration of the carbon black was 1 wt %, 5 wt %, 10 wt %, or 20 wt % were measured.

Figure 3:
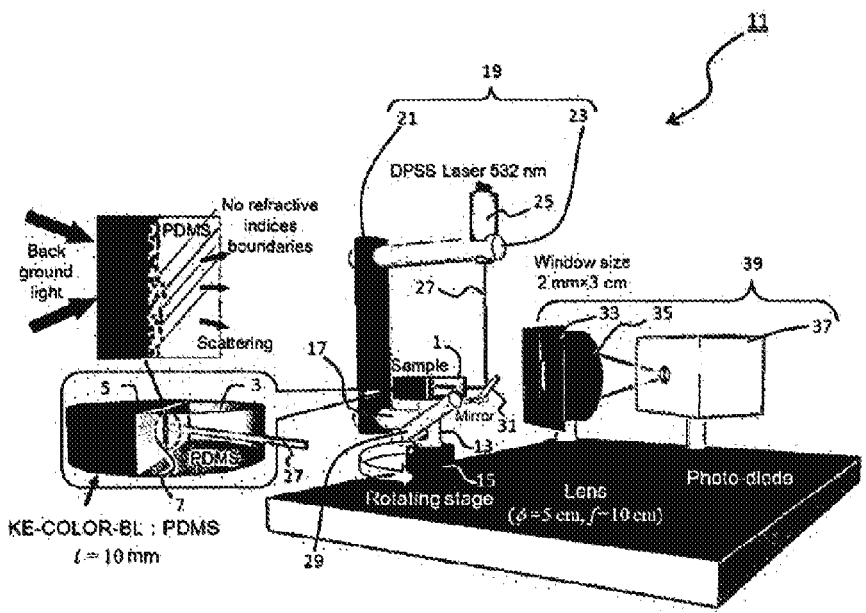
FIG. 3 illustrates a system for measuring angular characteristics with regard to the scattered light intensity used in the measurement herein.

FIG. 3 illustrates an angular characteristics measuring system 11 for the scattered light intensity used in the measurement herein. As illustrated in FIG. 3, the disk-shaped sample 1 is placed on a rotating stage 15 having a rotating shaft 13.

The rotating shaft 13 includes a branch portion 17 that extends from the rotating shaft 13 in a direction orthogonal to an axial direction of the rotating shaft 13. The branch portion 17 is coupled to a support column 21 of a light source supporting unit 19. The light source supporting unit 19 has the support column 21 and a light source fixing portion 23 that branches off from the support column 21. A DPSS laser light source 25 that emits a laser beam at a wavelength of 532 nm is fixed to the light source fixing portion 23.

A laser beam 27 emitted from the DPSS laser light source 25 travels downward, as illustrated in FIG. 3, is redirected by a reflection mirror 31 supported by a reflection mirror supporting portion 29, and becomes incident onto the disk-shaped sample 1. The reflection mirror supporting portion 29 is disposed at the rotating shaft 13 of the rotating stage 15. The reflection mirror 31 is adjusted such that the laser beam 27 is incident onto an interface 7 between the transparent semicircular portion 3 and the pigment semicircular portion 5 of the disk-shaped sample 1 at an angle of incidence of 45 degrees.

The disk-shaped sample 1 has the transparent semicircular portion 3 and the pigment semicircular portion 5, as described above. The silicone resins of the two semicircular portions are resins of the same type and thus have the same refractive index. Therefore, the laser beam 27 incident onto the disk-shaped sample 1 experiences basically no interface reflection at the interface 7.

As described above, the laser beam 27 is incident onto the pigment semicircular portion 5 without experiencing interface reflection at the interface 7. The carbon black and the silicone resin are different materials and have different refractive indices. Therefore, the laser beam 27 that has reached the carbon black is absorbed or scattered by the carbon black.

The absorption coefficient of the carbon black is $7.2 \times 10^2/$ cm with respect to the laser beam 27 having a wavelength of 532 nm. Therefore, the laser beam 27 that has reached the carbon black is readily absorbed by the carbon black. The laser beam 27 that is not absorbed by the carbon black is scattered in various directions by the carbon black. The portion of the scattered light that travels to the transparent semicircular portion 3 from the pigment semicircular portion 5 exits to the outside from the transparent semicircular portion 3.

As illustrated in FIG. 3, a scattered light measuring unit 39 is provided on a side toward which the laser beam 27 exits to the outside from the transparent semicircular portion 3. The scattered light measuring unit 39 includes a slit 33 having an aperture portion with a width of 2 mm and a length of 30 mm in the up and down direction, a condenser lens 35 that condenses the light that passes through the slit 33, and a detector 37 having a photodiode for measuring the intensity of the laser beam 27 condensed by the condenser lens 35. The scattered light measuring unit 39 restricts the light incident onto the detector 37 with the slit 33.

As described above, the disk-shaped sample 1, the DPSS laser light source 25, and the reflection mirror 31 are integrally supported by the light source supporting unit 19 and the reflection mirror supporting portion 29 that are coupled to each other via the rotating shaft 13 and the branch portion 17. Thus, the angle at which the light from the DPSS laser light source 25 is incident onto the disk-shaped sample 1 is retained even when the rotating shaft 13 is rotated.

Rotating the rotating shaft 13 of the rotating stage 15 in this state makes it possible to make an adjustment such that some of the scattered light of the laser beam 27 that exits to the outside from the transparent semicircular portion 3 is guided to the slit 33 in the scattered light measuring unit 39 while the angle of incidence is retained.

As described above, the slit 33 fixes the angle of incidence of the incident light, as illustrated in FIG. 3. Therefore, rotating the rotating shaft 13 of the rotating stage 15 enables the scattered light measuring unit 39 to measure the intensity of only the light scattered in a specific angular direction. In other words, the angular characteristics of the scattered light intensity radiated from the disk-shaped sample 1 can be measured.

Figure 4:
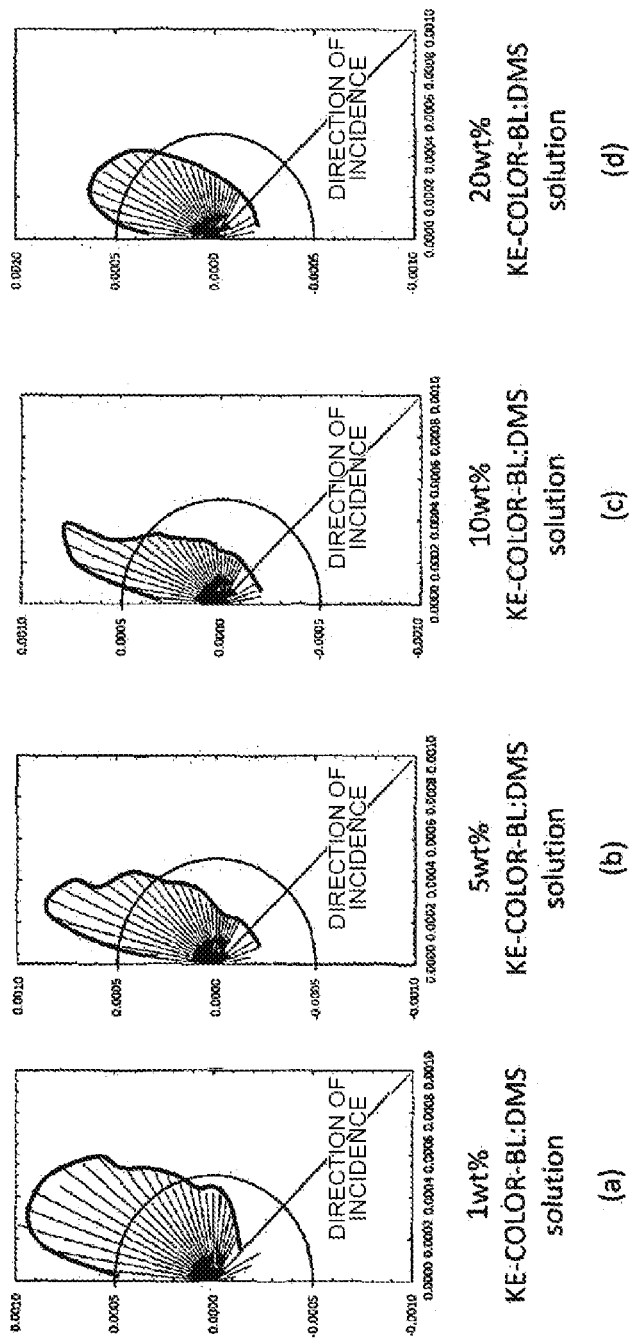
FIG. 4 is a set of views to illustrate the angular characteristics distributions of the scattered light intensity when four samples are used.

FIG. 4 illustrates the angular characteristics distributions of the scattered light intensity in the four samples. FIG. 4(a) shows the angular characteristics distribution when the concentration of the carbon black in the sample is 1 wt %, FIG. 4(b) shows the angular characteristics distribution when the concentration of the carbon black in the sample is 5 wt %, FIG. 4(c) shows the angular characteristics distribution when the concentration of the carbon black in the sample is 10 wt %, and FIG. 4(d) shows the angular characteristics distribution when the concentration of the carbon black in the sample is 20 wt %.

In the angular characteristics distributions illustrated in FIG. 4, the length of the line segment in each angular direction indicates the scattered light intensity. Thus, the area defined by a curved line connecting the leading ends of the line segments indicates the integrated reflection intensity (scattering intensity) of the laser beam incident onto the sample.

As can be clearly seen from FIGS. 4(a) to 4(d), the integrated reflection intensity (scattering intensity) is high when the concentration of the carbon black is 1 wt %. Thus, if a light guide path composed of a transparent silicone resin is enclosed by a silicone resin in which a pigment (carbon black) is dispersed in order to absorb the stray light in the light guide path and the stray light from the light guide path is absorbed by the pigment-dispersed silicone resin, there may be a case in which an influence of the scattered light from the pigment-dispersed silicone resin cannot be ignored when the concentration of the carbon black is 1 wt %.

On the other hand, when the concentration of the carbon black is 5 wt %, 10 wt %, or 20 wt %, the integrated reflection intensity (scattering intensity) is low. Therefore, the pigment-dispersed silicone resin for absorbing the stray light can conceivably fulfill its function at a sufficient level.

Although the reason why the integrated reflection intensity (scattering intensity) is high when the concentration of the carbon black is 1 wt % is not necessarily clear, the following is conceivable. When the concentration of the carbon black is 1 wt %, the distance between the carbon black particles is large, and an influence of multiplex scattering may thus be large. In other words, when scattered light from one carbon black impinges on and is scattered by another carbon black, the scattered light may highly likely to pass through a space (gap) between the carbon blacks and travel toward the transparent semicircular portion 3 since the distance between the carbon black particles is large.

Here, a light guide path composed of a transparent silicone resin is prepared, and a pigment-dispersed silicone resin that is composed of the same material as the transparent silicone resin and in which a pigment (carbon black) having a property of absorbing stray light from the light guide path is dispersed in the silicone resin is prepared. An optical system composed of the silicone resins and having a two-layer structure in which the light guide path is enclosed by the pigment-dispersed silicone resin is considered.

In the optical system having the above-described structure, the transparent silicone resin of the light guide path and the pigment-dispersed silicone resin are materials of the same type, and thus light does not experience interface reflection at an interface between the two resins. Therefore, stray light incident onto the pigment-dispersed silicone resin from the light guide path is incident as-is on the pigment-dispersed silicone resin, and a large portion of the stray light is absorbed by the carbon black.

The stray light that has reached the carbon black but is not absorbed by the carbon black is scattered at the surface of the carbon black. Some of the scattered light (reflected light) may be incident again onto the light guide path in some cases.

Therefore, with regard to the optical system composed of the silicone resins, which has a two-layer structure, for reducing the influence of the stray light from the light guide path, it is desirable that (1) the integrated reflection intensity (scattering intensity) at the carbon black be as low as possible and (2) the back scattering intensity at the carbon black be as low as possible.

Calculations performed by the inventors have revealed that the scattering increases when the particle size (diameter) of the carbon black exceeds 2.0 µm and that the scattering conditions (1) and (2) for the optical system composed of the silicone resins having the two-layer structure, for example, become impractical.

Therefore, it is preferable that the particle size (diameter) of the carbon black in the pigment-dispersed silicone resin be from 0.5 µm to 2.0 µm. It is also preferable that the concentration of the carbon black be from 5 wt % to 20 wt %.

The order of importance between (1) and (2) varies depending on the shape of the interface between the transparent silicone resin of the light guide path and the pigment-dispersed silicone resin.

FIG. 5 is a set of diagrams showing that the desirable scattering condition differs depending on the state of the light exit of the light guide unit. As illustrated in FIG. 5(a), an exit end 55 of a light guide unit 53 through which light 51 serving as a signal passes is not closed by a pigment-dispersed silicone resin 57 and is open. A case in which the exit end 55 serves as a sensor 59 (e.g., an optical sensor that measures the intensity of the light) that receives an optical signal is considered. In this case, it is desired that scattered light 61 (noise light) from the pigment-dispersed silicone resin 57 produced when stray light 60 is incident onto the pigment-dispersed silicone resin 57 be as little as possible and do not reach the sensor 59 in particular. In other words, it is more important that (1) the integrated reflection intensity (scattering intensity) be low.

On the other hand, as illustrated in FIG. 5(b), a case in which an exit end 67 of a light guide unit 65 through which light 63 serving as a signal passes is closed by a pigment-dispersed silicone resin 69 and the light 63 serving as a signal is to be totally absorbed by the pigment-dispersed silicone resin 69 is considered. In this case, it is desired that scattered light 71 (noise light) from the pigment-dispersed silicone resin 69 be as little as possible and do not travel backward. In other words, it is more important that (2) the back scattering intensity be low.

As in the light-induced fluorescent measurement device (Patent Literature Document 1), previously proposed by the inventors, in which the optical system and the monolithic housing are constituted with the use of a resin that at least partially contains a pigment, the light guide unit composed of a transparent silicone resin need not be entirely filled with the transparent silicone resin and may include a space (vacant portions).

With regard to the pigment-dispersed silicone resin, the thickness of the silicone resin when the optical density (OD value) was 6 was investigated. Here, the wavelength of the light was 532 nm.

When the concentration of the carbon black was 1 wt %, OD=0.3 (transmittance of 50%) was achieved when the thickness of the silicone resin was approximately 0.1 mm. In other words, when a microchip that includes an optical system having a structure in which a light guide path composed of a transparent silicone resin is enclosed by a pigment-dispersed silicone resin is constituted, the thickness of the pigment-dispersed silicone resin is 1.9 mm (approximately 2 mm) in order to achieve OD=6 when the concentration of the carbon black is 1 wt %. Furthermore, the light guide path composed of the transparent silicone resin needs a certain thickness in order to function as the path for guiding the light.

Therefore, when the above-described microchip is fabricated and the concentration of the carbon black is 1 wt %, the thickness of the microchip in the up and down direction is as follows: the thickness of the transparent light guide path+the thickness of approximately 2 mm of the pigment-dispersed silicone resin that encloses the upper portion of the transparent light guide path+the thickness of approximately 2 mm of the pigment-dispersed silicone resin that encloses the lower portion of the transparent light guide path. In other words, the thickness of the microchip includes at least the thickness of the transparent light guide path+approximately 4 mm, which results in a large film thickness for a microchip. Therefore, when the pigment-dispersed silicone resin is fabricated, it is not preferable that the concentration of the carbon black be no greater than 1 wt %.

On the other hand, when the concentration of the carbon black is 5 wt %, the thickness of the pigment-dispersed silicone resin for achieving OD=6 is 0.4 mm Therefore, the thickness of the microchip in the up and down direction is the thickness of the transparent light guide path+0.8 mm, which makes it possible to keep the size of the microchip to a practical size. Thus, when the pigment-dispersed silicone resin is fabricated, it is preferable that the concentration of the carbon black be at least no less than 5 wt %.

In summarizing the above, when an optical member having a light-blocking function is manufactured by dispersing a carbon black in a silicone resin, the manufactured optical member has the following characteristics in accordance with $C_{cb}$, in which $C_{cb}$ represents the concentration of the carbon black.

(1) $C_{cb} \leq 5$ wt % . . . The integrated reflection intensity (scattering intensity) becomes high, leading to an inferior light-blocking function. When a microchip having the above-described two-layer structure is manufactured, the microchip becomes too thick in order to achieve OD=6.

(2) 5 wt % $\leq C_{cb} \leq 10$ wt % . . . The carbon black does not coagulate, and the characteristics as the silicone resin (rubber) can be retained. The particle size (diameter) of the carbon black is from 0.5 µm to 2.0 µm.

(3) 10 wt %≤$C_{cb}$≤20 wt % . . . The carbon black may coagulate in some cases. The particle size of the carbon black in a region where coagulation has not occurred is from 0.5 μm to 2.0 μm.

(4) 20 wt %<$C_{cb}$ . . . Some of the particle sizes of the carbon black exceed 2 μm due to the coagulation of the carbon black. When the concentration of the carbon black increases to a certain extent, the base resin SIM-360 of the PDMS and the carbon black completely separate from each other depending on the concentration, and it becomes impossible to disperse the carbon black in the silicone resin.

In other words, when an optical member having a light-blocking function (an example of an "optical member" and a "stray light absorbing unit" set forth in the claims of the present application) is manufactured by dispersing a carbon black in a silicone resin in order to use the optical member in a microchip, 5 wt %≤$C_{cb}$≤20 wt % is preferable, and 5 wt %≤$C_{cb}$≤10 wt % is further preferable. By using such an optical member adjacent to a light guide unit that transmits (guides) incident light (an example of a "light guide unit" set forth in the claims of the present application), a light guide member that can prevent (or reduce) the stray light and/or the noise light from entering a sensor (an example of a "light guide member" set forth in the claims of the present application) can be manufactured.

On the other hand, it was found that when the size $D_{cb}$ of the carbon black dispersed in the optical member manufactured in accordance with the above-described manufacturing method satisfied $D_{cb}$≤2.0 μm, the integrated reflection intensity (scattering intensity) was low and a favorable light-blocking property was obtained. In addition, it was found that when $D_{cb}$>2.0 μm holds, the integrated reflection intensity was high and it was difficult to achieve a favorable light-blocking property.

In order to manufacture the above-described optical member, a carbon black is introduced at an appropriate concentration into the base resin of the uncured silicone impression material SIM-360 (an example of an "uncured undispersed silicone resin" set forth in the claims of the present application) and dispersed through mixing (an example of "dispersing" set forth in the claims of the present application). Then, the dispersed silicone resin (an example of an "uncured dispersed silicone resin" set forth in the claims of the present application) is cured in one hour to obtain a pigment-dispersed silicone resin (an example of a "cured dispersed silicone resin" set forth in the claims of the present application) (an example of "curing" set forth in the claims of the present application).

In a region where the noise light (an example of "noise light" set forth in the claims of the present application) does not reach, it poses no problem even if the integrated reflection intensity increases due to the size of the carbon black. Therefore, it can be said that a preferable microchip can be manufactured as long as $D_{cb}$≤2.0 μm holds in a region extending to the depth of the absorption length of the noise light (an example of a "specific region" and a "region extending to a depth of an absorption length of specific light" set forth in the claims of the present application).

Second Embodiment

Next, with the use of a carbon nanotube (FloTube 9000 from CNano Technology Ltd. in the United States) as a carbon-based pigment, the performance of suppressing stray light scattering was evaluated in the disk-shaped sample 1 illustrated in FIG. 1 and the angular characteristics measuring system 11 for the scattered light intensity illustrated in FIG. 3, in a similar manner to the first embodiment. In order to compare the performances, a carbon black (KE-COLOR-BL from Shin-Etsu Silicone (registered trademark)) was also used as a carbon-based pigment.

Three types of disk-shaped samples 1 were fabricated with the concentration of the carbon nanotube dispersed in the PDMS varied. In addition, a comparative example was prepared, i.e., another type of disk-shaped sample 1 was fabricated with the carbon black being used as a carbon-based material. Specifically, for those in which the carbon nanotube was used, the concentration of the carbon nanotube dispersed in the PDMS was varied among 0.17 wt %, 0.83 wt %, and 1.7 wt %. For the one in which the carbon black was used, the concentration of the carbon black dispersed in the PDMS was set to 10 wt %. The curing time of the PDMS was one hour.

The shape of the carbon nanotube was substantially uniform overall, the mean diameter was from 10 nm to 15 nm, and the mean length was 10 μm.

On the other hand, the shape of the carbon black varied. The observation of the PDMS resin in which the carbon black was dispersed revealed that the particle sizes of the carbon black substantially all fell within the range of from approximately 0.5 μm to 2.0 μm and a variation in the particle size was relatively small.

The angular characteristics of the scattered light intensity were measured in the samples in which the concentration of the carbon nanotube was 0.17 wt %, 0.83 wt %, or 1.7 wt % and in the sample in which the concentration of the carbon black was 10 wt %.

Figure 6:
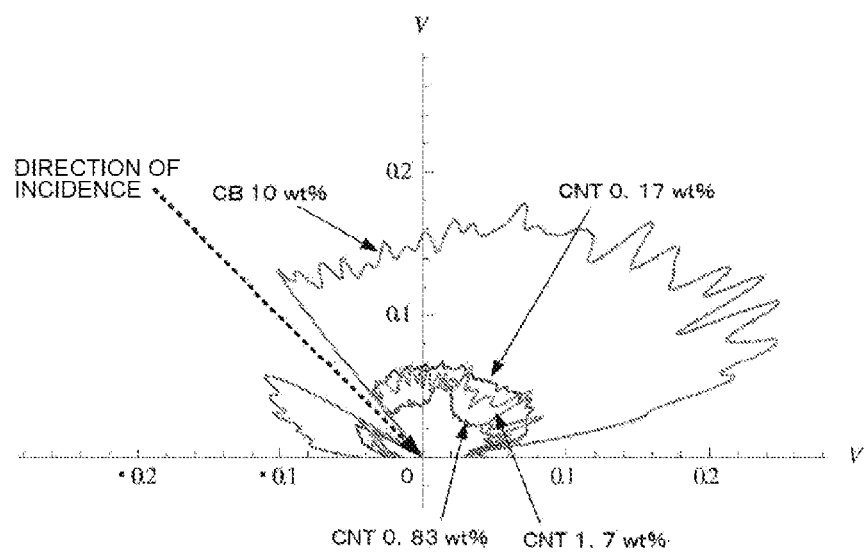
FIG. 6 illustrates the angular characteristics distribution of the scattered light intensity when four samples are used, with the concentration of the carbon nanotube being 0.17 wt %, 0.83 wt %, and 1.7 wt %, and with the concentration of the carbon black being 10 wt %.

FIG. 6 illustrates the angular characteristics distribution of the scattered light intensity in the samples in which the concentration of the carbon nanotube was 0.17 wt %, 0.83 wt %, and 1.7 wt % and in the sample in which the concentration of the carbon black was 10 wt %.

In the angular characteristics distribution illustrated in FIG. 6, the length (distance) from the origin O to each curved line indicates the scattered light intensity. Thus, the area defined by each curved line indicates the integrated reflection intensity (scattering intensity) of the laser beam incident onto the sample.

As can be clearly seen from FIG. 6, the integrated reflection intensity (scattering intensity) is low in all of the cases in which the carbon nanotube at three different concentrations was used as the pigment, as compared to the case in which the carbon black was used as the pigment.

As proposed in the first embodiment, when a light guide path composed of a transparent silicone resin is enclosed by a silicone resin in which a pigment (carbon black) is dispersed in order to absorb the stray light in the light guide path and the stray light from the light guide path is absorbed by the pigment-dispersed silicone resin, the integrated reflection intensity (scattering intensity) is low when the concentration of the carbon black is 10 wt %, and the pigment-dispersed silicone resin for absorbing the stray light can fulfill its function at a sufficient level.

When the carbon nanotube is used as the pigment, the scattered light intensity is even lower than that in the case in which the carbon black is used at a concentration of 10 wt %. Thus, the silicone resin for absorbing the stray light in which the carbon nanotube is dispersed may be further preferable to the one in which the carbon black is used and can conceivably fulfill its function at a sufficient level.

Although the reason why the integrated reflection intensity (scattering intensity) obtained when the carbon nanotube is used as the pigment is more prominently lower than the integrated reflection intensity (scattering intensity)

obtained when the carbon black is used is not necessarily clear, the following is conceivable.

The carbon nanotube has a linear structure whereas the carbon black typically has a particulate structure. Therefore, the orientation (light distribution) of the carbon nanotube dispersed in the silicone resin and the travel direction of the scattered light can conceivably be in the relationship suitable for improving the effect of suppressing the scattered light.

In addition, when the cases in which the concentrations of the carbon nanotube are 0.17 wt %, 0.83 wt %, and 1.7 wt % are compared to each other, the integrated reflection intensity (scattering intensity) is the lowest when the concentration is 0.83 wt %, as can be clearly seen from FIG. 6. Therefore, when the carbon nanotube is used, the optimal concentration of the carbon nanotube to reduce the integrated reflection intensity (scattering intensity) as much as possible can conceivably be within the concentration range of from 0.17 wt % to 1.7 wt %.

As described above, the integrated reflection intensity (scattering intensity) is low in all of the cases in which the carbon nanotube is used as the pigment, as compared to the case in which the carbon black is used as the pigment, and thus the silicone resin for absorbing the stray light in which the carbon nanotube is dispersed may be further preferable to the case in which the carbon black is used and can conceivably fulfill its function at a sufficient level.

In order to confirm the above, an optical system illustrated in FIG. 7 was constructed, and the stray light absorption characteristics of the silicone resin for absorbing the stray light in which the carbon nanotube was dispersed were compared to the stray light absorption characteristics of the silicone resin for absorbing the stray light in which the carbon black was dispersed.

As illustrated in FIG. 7, an optical member having a two-layer structure, which is constituted by a light guide path composed of a transparent PDMS resin having an incident surface with an area of 2 mm×1 mm and a length of 50 mm and a pigment-dispersed silicone resin that encloses the light guide path and in which a carbon-based pigment is dispersed is prepared. For the sake of easier understanding, in FIG. 7, the upper surface of the light guide path composed of the transparent PDMS resin is exposed, but the actual transparent light guide path is enclosed by the pigment-dispersed silicone resin except at its two opposite end portions.

In the optical system having the above-described structure, the transparent silicone resin of the light guide path and the pigment-dispersed silicone resin are materials of the same type, and thus light does not experience interface reflection at an interface between the two resins. Therefore, stray light incident onto the pigment-dispersed silicone resin from the light guide path is incident as-is onto the pigment-dispersed silicone resin, and a large portion of the stray light is absorbed by the carbon-based pigment.

In the optical member illustrated in FIG. 7(a), a laser beam having a wavelength of 532 nm and a beam diameter of 1 mm, for example, is incident onto an end A of the optical member. Even when the light guide path is not filled with the transparent PDMS resin but is simply hollow, the laser beam does not attenuate while the laser beam travels from the end A to an end B of the light guide path since no part of the laser beam hits the pigment-dispersed PDMS resin if the divergence of the laser beam or the absorption of the laser beam by the light guide path is ignored.

On the other hand, as illustrated in FIGS. 7(b) and 7(c), when the optical member bends 45 degrees or 90 degrees, the laser beam incident onto the end A of the light guide path impinges on the pigment-dispersed PDMS resin, and most of the laser beam that has impinged on the pigment-dispersed PDMS resin is absorbed by the pigment-dispersed PDMS resin. Thus, the laser beam is attenuated. When the bending angle of the optical member increases, so does the proportion of the laser beam incident onto the end A of the light guide path that impinges on the pigment-dispersed PDMS resin enclosing the light guide path. In other words, the intensity of the laser beam reaching the end B decreases.

Thus, three optical members (optical member 1, optical member 2, and optical member 3) were prepared, and the relationship between the bending angles of the optical members and the attenuation rate of the incident laser beam was evaluated. The three optical members are configured as follows.

The structure of the optical member 1 is that the light guide path is hollow and the carbon black is dispersed in the pigment-dispersed PDMS at a concentration of 10 wt %.

The structure of the optical member 2 is that the light guide path is filled with the transparent PDMS resin and the carbon black is dispersed in the pigment-dispersed PDMS at a concentration of 10 wt %.

The structure of the optical member 3 is that the light guide path is filled with the transparent PDMS resin and the carbon nanotube is dispersed in the pigment-dispersed PDMS at a concentration of 0.83 wt %.

Figure 8:
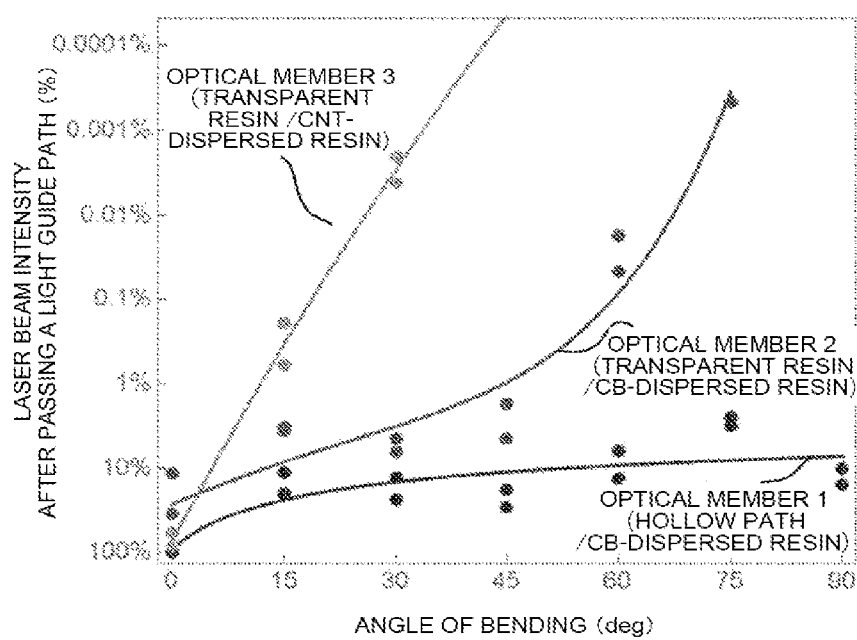
FIG. 8 illustrates the relationship between the bending angle of the optical member and the attenuation rate of the incident laser beam.

FIG. 8 illustrates the relationship between the bending angles of the optical members and the attenuation rate of the incident laser beam for the optical member 1, the optical member 2, and the optical member 3. Here, the intensity of the laser beam at the end B obtained when the bending angle of the optical member 1 is 0 degree (hollow light guide path/carbon black-dispersed resin) is set to 100%.

As illustrated in FIG. 8, in the case of the optical member 1, i.e., when the light guide path of the optical member is hollow and the hollow light guide path is enclosed by the pigment-dispersed resin in which the carbon black is dispersed, the intensity of the laser beam at the end B attenuates to 10% if the bending angle is 30 degrees, but the intensity of the laser beam remains at around 10% even when the bending angle is changed to 90 degrees. In other words, the attenuation rate does not change much at $1/10$ (OD=1). A conceivable reason for this is as follows. Of the laser beam incident onto the end A, an s-polarized component with large Fresnel reflection is reflected at the surface of the pigment-dispersed PDMS resin, which encloses the hollow light guide path, and is guided to the end B.

On the other hand, in the case of the optical member 2, i.e., when the light guide path of the optical member is composed of the transparent PDMS resin and the light guide path is enclosed by the pigment-dispersed resin in which the carbon black is dispersed, the intensity of the laser beam is approximately 6% and the attenuation rate is approximately $1/6$ (OD=approximately 1.2) if the bending angle is 30 degrees, and the intensity of the laser is approximately 0.005% and the attenuation rate is approximately $5/1000$ (OD=approximately 2.3) if the bending angle is 60 degrees.

A conceivable reason why the attenuation rate is more favorable in the case of the optical member 2 than in the case of the optical member 1 is as follows. The light does not experience interface reflection at the interface between the two resins in the optical member 2 since the transparent PDMS resin constituting the light guide path and the carbon black pigment-dispersed PDMS resin are materials of the same type. In other words, Fresnel reflection of the s-polarization component, which occurs in the optical member 1, conceivably does not occur in the optical member 2.

In the case of the optical member 3, i.e., when the light guide path is composed of the transparent PDMS resin and the light guide path is enclosed by the pigment-dispersed resin in which the carbon nanotube is dispersed, the intensity of the laser beam is already approximately 0.005% and the attenuation rate is approximately 1/20000 (OD=approximately 4.3) if the bending angle is 30 degrees, and the laser beam was unable to be observed if the bending angle was 45 degrees. The observation limit of the measuring device is OD=approximately 5.5, and thus there is a possibility that OD=6 is achieved when the bending angle is 45 degrees.

In this manner, it was found that, when the bending angle is equal to or greater than 30 degrees, a tremendous effect in terms of extinction of stray light was obtained when the carbon nanotube was used in the pigment-dispersed PDMS, as compared to the case in which the carbon black was used as the pigment. A conceivable reason for this is that because the integrated reflection intensity (scattering intensity) is lower in the carbon nanotube than in the carbon black as described above, the intensity of the scattered light that reaches the end B of the optical member is notably low.

In other words, scattering of stray light is suppressed more effectively when a carbon nanotube is employed as a carbon-based pigment and a resin portion in which the carbon nanotube is dispersed is used adjacent to a light guide unit adapted to transmit incident light than when a carbon black is used as the pigment, and the intensity of the stray light can be attenuated further preferably.

REFERENCE NUMERALS AND SYMBOLS 1 disk-shaped sample, 3 transparent semicircular portion, 5 pigment semicircular portion, 7 interface, 11 angular characteristics measuring system, 13 rotating shaft, 15 rotating stage, 17 branch portion, 19 light source supporting unit, 21 support column, 23 light source fixing portion, 25 DPSS laser light source, 27 laser beam, 29 reflection mirror supporting portion, 31 reflection mirror, 33 slit, 35 condenser lens, 37 detector, 39 scattered light measuring unit, 51 light, 53 light guide unit, 55 exit end, 57 pigment-dispersed silicone resin, 59 sensor, 60 stray light, 61 scattered light, 63 light, 65 light guide unit, 67 exit end, 69 pigment-dispersed silicone resin, 71 scattered light

The invention claimed is:

1. An optical device comprising:
   a light guide unit to transmit incident light, the light guide unit extending in a longitudinal direction and having a dimension in a direction perpendicular to the longitudinal direction being the same entirely along the longitudinal direction; and, P1 a carbon particle-dispersed unit in which carbon black particles are dispersed in a specific region of a silicone resin, the carbon particle-dispersed unit being coaxial to the light guide unit and surrounding the external surface of the light guide unit in its entirety along the longitudinal direction,
   the carbon black particles being stray light scattering suppressing particles that reduce an intensity of light incident onto the carbon black particles and scattered by the carbon black particles, and
   each of the carbon black particles in the carbon particle-dispersed unit having a minor axis equal to or smaller than 2.0 µm and a concentration of the carbon black particles in the carbon particle-dispersed unit being 5 wt %, inclusive, and 20 wt %, inclusive.

2. The optical device according to claim 1, wherein the carbon particles in the carbon particle-dispersed unit include a carbon nanotube.

3. The optical device according to claim 2, wherein the specific region is a region corresponding to a region extending to a depth of an absorption length of specific light from a boundary between the light guide unit and the carbon particle-dispersed unit.

4. The optical device according to claim 1, wherein the specific region is a region corresponding to a region extending to a depth of an absorption length of specific light from a boundary between the light guide unit and the carbon particle-dispersed unit.

5. The optical device according to claim 4, wherein the specific light is noise light different from the incident light.

6. The light guide device according to claim 5, wherein the carbon black particles in the carbon particle-dispersed unit include a carbon nanotube.

7. The optical device according to claim 4, wherein the carbon particles in the carbon particle-dispersed unit include a carbon nanotube.

8. The light guide device according to claim 1, further comprising an optical sensor attached to a light exit of the light guide unit.

9. The optical device according to claim 1, wherein a thickness of a cylindrical wall of the carbon particle-dispersed unit is between 0.4 mm, inclusive, and 2 mm.

10. A light guide member that guides incident light, the light guide member comprising:
    a light guide unit that transmits the incident light and consisting of a silicone resin transparent to the incident light, the light guide unit extending in a longitudinal direction and having a dimension in a direction perpendicular to the longitudinal direction being the same entirely along the longitudinal direction; and
    a stray light absorbing unit surrounding the external surface of the light guide unit in its entirely along the longitudinal direction, and including a carbon particle-dispersed silicone resin in which carbon black particles are dispersed in a silicone resin having a refractive index, which is equal to a refractive index of the transparent silicone resin of the light guide unit,
    the light guide unit extending coaxial to the stray light absorbing unit, the carbon black particles being stray light scattering suppressing particles that reduce an intensity of light incident onto the carbon black particles and scattered by the carbon black particles, and
    each of the carbon black particles in the stray light absorbing unit having a minor axis equal to or smaller than 2.0 µm and a concentration of the carbon black particles in the stray light absorbing unit being between 5 wt %, inclusive, and 20 wt %, inclusive.

11. The light guide member according to claim 10, wherein the carbon black particles in the carbon particle-dispersed unit include a carbon nanotube.

12. The light guide member according to claim 10, wherein the light guide unit receives the incident light at a first end thereof, and a second end of the light guide unit which is opposite to the first end thereof is open.

13. The light guide member according to claim 12, further comprising an optical sensor attached to the second end of the light guide unit.

14. The light guide member according to claim 10, wherein a thickness of a cylindrical wall of the stray light absorbing unit is between 0.4 mm, inclusive, and 2 mm.

15. A method of manufacturing an optical device adapted to transmit incident light, the optical device including a silicone resin unit and a light guide unit extending in a longitudinal direction and having a dimension in a direction perpendicular to the longitudinal direction being the same entirely along the longitudinal direction, and being configured to attenuate the incident light, the method comprising:

preparing the silicone resin unit that surrounds the external surface of the light guide unit in its entirety along the longitudinal direction, and the silicone resin unit being coaxial to the light guide unit;

dispersing carbon black particles in the silicone resin unit that has not been cured, to form a carbon particle-dispersed silicone resin unit; and curing the carbon particle-dispersed silicone resin unit to form a cured carbon particle-dispersed silicone resin unit such that each of the carbon black particles in the cured carbon particle-dispersed silicone resin unit has a minor axis equal to or smaller than 2.0 micrometers, said dispersing carbon black particles dispersing the carbon black particles in the silicone resin unit at a concentration of no lower than 5 wt % nor higher than 20 wt %.

16. A method of manufacturing a light guide member comprising:

preparing a first silicone unit that transmits incident light and includes a first silicone resin transparent to the incident light, the first silicone unit extending in a longitudinal direction and having a dimension in a direction perpendicular to the longitudinal direction being the same entirely along the longitudinal direction, and consisting of the first silicone resin; and making a second silicone unit around the first silicone unit such that the second silicone unit surrounds the external surface of the first silicon unit in its entirety along the longitudinal direction and is coaxial to the first silicone unit, the second silicone unit including a second silicone resin having a refractive index equal to a refractive index of the first silicone resin, the second silicone unit also including carbon black particles dispersed in the second silicone resin, each of the carbon black particles having a minor axis equal to or smaller than 2.0 μm, a concentration of the carbon black particles in the carbon particle-dispersed unit being between 5 wt %, inclusive, and 20 wt %, inclusive.

* * * * *